J. G. CLINE.
BUSHING FOR THE SUSPENSION PLATES OF HOIST BLOCKS.
APPLICATION FILED JAN. 31, 1912.
1,064,612.
Patented June 10, 1913.
2 SHEETS—SHEET 1.
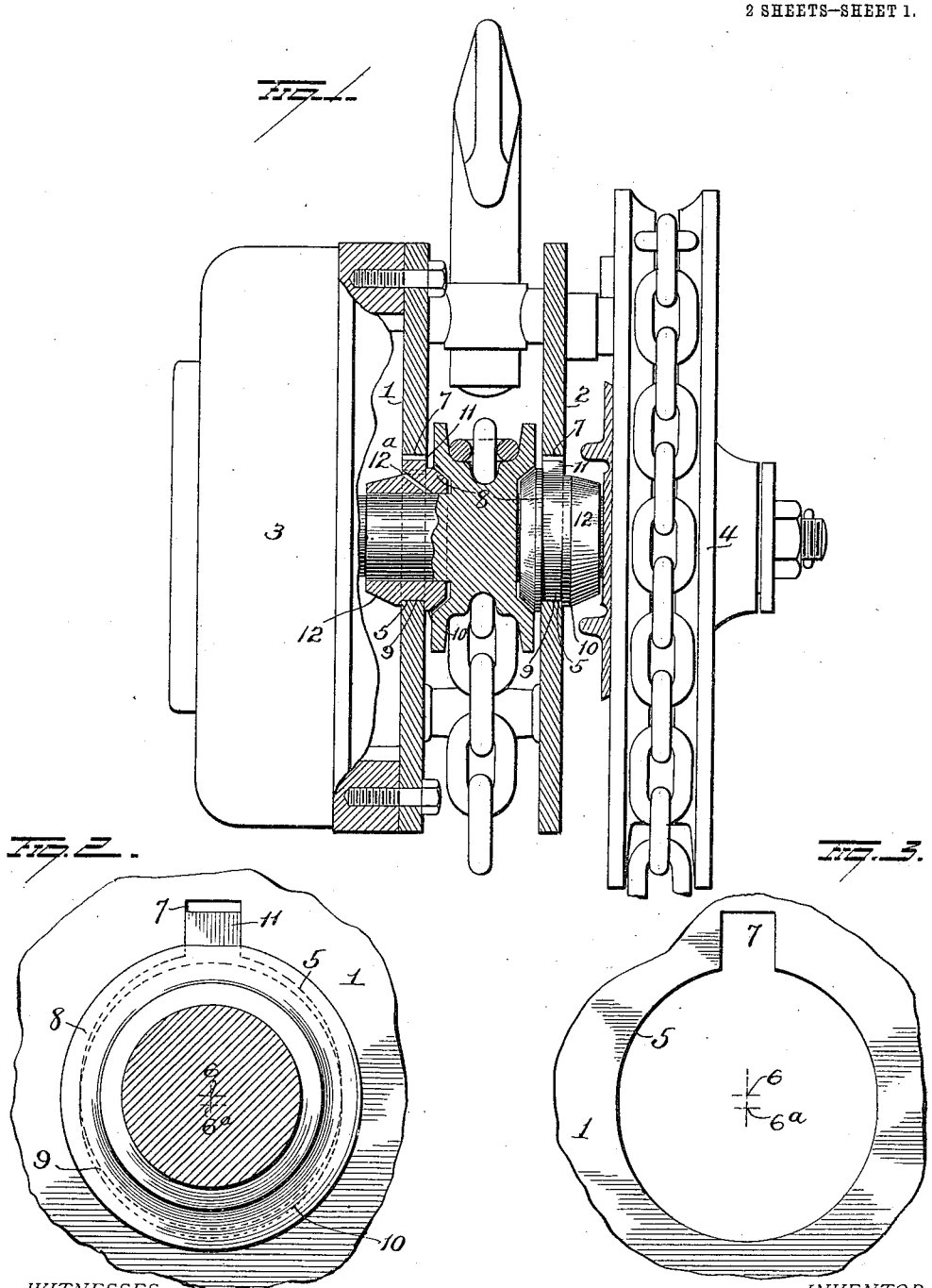
WITNESSES
INVENTOR
J. G. Cline
Attorney

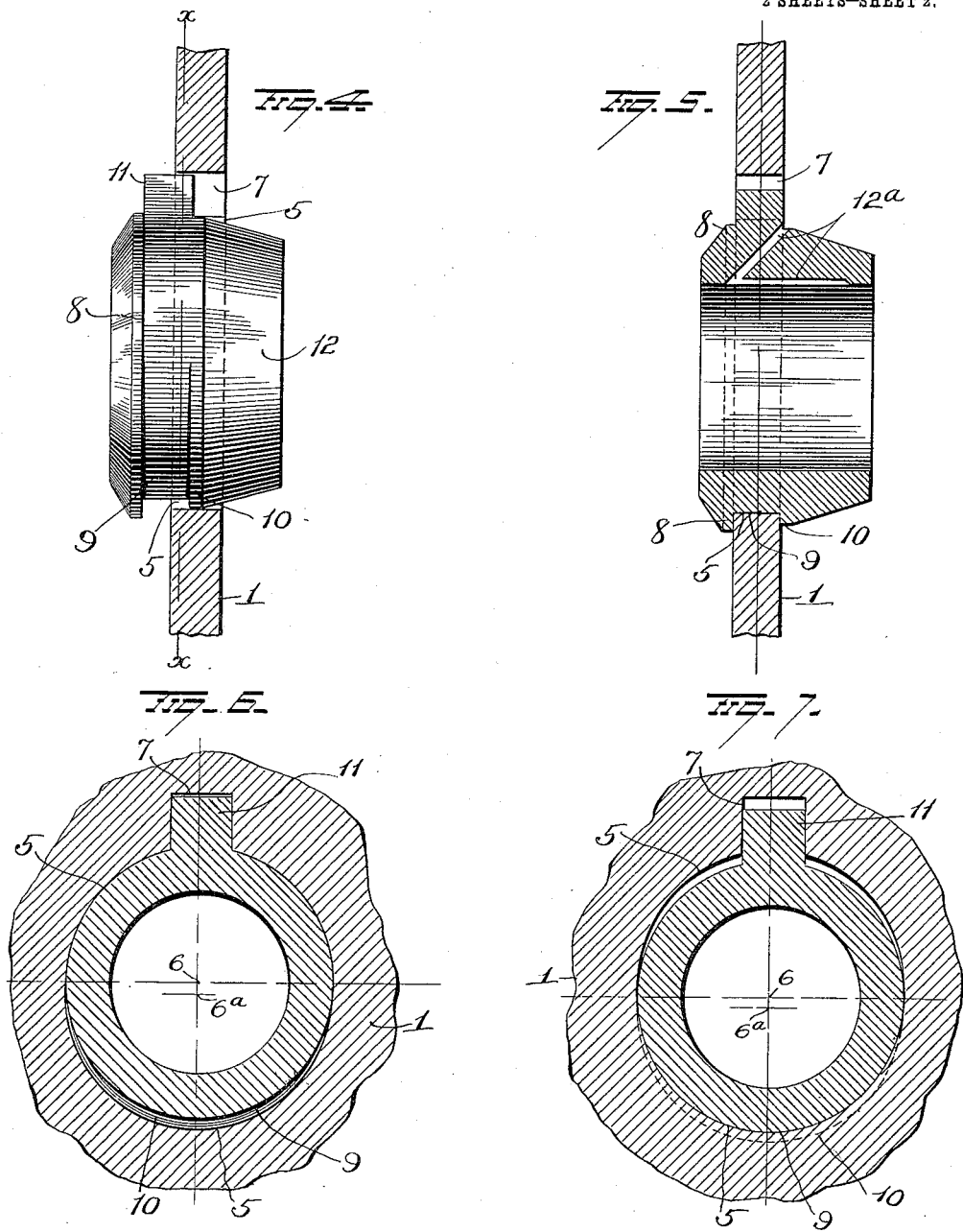

UNITED STATES PATENT OFFICE.

JEROME G. CLINE, OF PLAINFIELD, NEW JERSEY, ASSIGNOR TO THE YALE & TOWNE MANUFACTURING COMPANY, OF STAMFORD, CONNECTICUT.

BUSHING FOR THE SUSPENSION-PLATES OF HOIST-BLOCKS.

1,064,612.  Specification of Letters Patent.  Patented June 10, 1913.

Application filed January 31, 1912. Serial No. 674,528.

*To all whom it may concern:*

Be it known that I, JEROME G. CLINE, a citizen of the United States, residing at Plainfield, in the county of Union and State of New Jersey, have invented certain new and useful Improvements in Bushings for the Suspension-Plates of Hoist-Blocks; and I do hereby declare the following to be a full, clear, and exact description of the invention, such as will enable others skilled in the art to which it appertains to make and use the same.

My invention relates to an improvement in bushing for the suspension plates of hoist blocks.

In hoist blocks of the type to which this invention is particularly applicable, two parallel steel plates, herein termed suspension plates, are provided with bearings for the main hoist sheave support, the said sheave being located between the two plates, which latter are spaced apart by suitable devices. A gear case is at the outer side of one plate and is carried thereby and the drive pulley of the block, is at the outer side of the other suspension plate, and the two suspension plates are carried by a yoke or hanger journaled in the plates. In one well known make of block of this type, the bearings or bushings for the main hoist sheave are turned down so that one end thereof makes a driving fit in a hole formed in its suspension plate, and the bushing is then upset on both sides of the suspension plate so as to secure it in place, and permanently unite it with its side plate.

The object of my invention is to provide a bushing which may be readily removed for renewal or repairs, and which, when in place, will be held against turning movement, and retained against endwise displacement, and my invention consists in the parts and combination of parts as will be more fully described and pointed out in the claims.

In the accompanying drawings, Figure 1 is a view partly in side elevation and partly in section of a pulley block showing my improvement applied to the suspension plates of the same. Fig. 2 is a view in elevation of a section of one of the suspension plates showing the bracket therein. Fig. 3 is a view of one of the suspension plates showing the bushing opening therein. Fig. 4 is a view in section of the plate showing the bushing partly entered. Fig. 5 is a similar view showing the bushing in place. Fig. 6 is a view on the line $x$—$x$ of Fig. 4, and Fig. 7 is a similar view of Fig. 5.

1 represents the side frame or suspension plate on the gear side of the block, and 2 the side frame or suspension plate on the drive pulley side. Gear casing 3 is located at the outer side of suspension plate 1, and drive pulley 4 is adjacent the outer side of suspension plate 2.

The two suspension plates 1 and 2, are preferably made of steel, and are held apart in proper relative positions by bolts and spacing sleeves or other devices, and each is provided with an opening 5, slightly oblong or oval, it being formed of two semi-circles struck from the centers 6, and 6ª. This opening 5 communicates at its top with a recess 7, preferably angular in shape as shown, and adapted to receive a projection integral with the top of the bushing for preventing the latter from turning.

The bushings are preferably made of bronze, and each comprises a body having an outer flange 8, a groove 9, shoulder 10, upward projection 11 and a tapered end 12. The flange 8, and the portion of the body intermediate the flange 8 and shoulder 10, except for the projection 11 at the top, are cylindrical, the shoulder 8 being concentric with said portion of the body. The shoulder 10, at both sides, projects from the lower half only of the bushing, consequently the groove 9 formed by the flange 8 and shoulder 10, is in the lower half of the bushing, the upper half of the bushing in rear of the flange 8, being cylindrical and merging into the tapered end 12, the latter also being continuous with the outer edge of the shoulder 10 as shown in Fig. 4. It will therefore be seen that the bushing, in the vertical plane of the shoulder 10, is slightly oval, and conforms in shape and size to the opening 5 in the suspension plates 1 and 2.

The upward or angular projection 11 on the bushing conforms in size and shape to the recess 7 in the suspension plate, hence when the tapered end of the bushing is entered in the opening 5, this projection 11 will about fill the recess, when the shoulder 10 on the bushing is within the opening, the latter being of a size and shape to admit of the passage of all that part of the bushing in rear of flange 8, as shown in Figs. 4 and 5. After the bushing has been entered as far as the flange 8, which is of greater diameter than the opening 5, its groove 9 permits it to drop down onto the lower wall of the opening 5, where it is held by its flange 8, and shoulder 10 against endwise movement, and by its projection 11, resting in recess 7, against any turning movement. The bushing is provided with an oil hole 12ª. The bushing may be removed by raising it up until its shoulder 10 clears the lower wall of the opening 5, and then withdrawing it. By this construction, the bushings, which are held down on their seats by the weight of the main hoist sheave, are retained in place against the possibility of accidental displacement without forcing or driving it into place and without the use of any locking devices, thus permitting them to be readily and quickly removed for renewal or repair.

It is evident that many slight changes might be resorted to in the relative arrangement of parts shown and described without departing from the spirit and scope of my invention. Hence I would have it understood that I do not wish to confine myself to the exact construction shown and described, but Having fully described my invention what I claim as new and desire to secure by Letters-Patent, is:—

1. The combination of a suspension plate having an elliptical opening therein, and a recess communicating with said opening, and a bushing shaped to conform to said opening and provided at its outer end with a peripheral flange of greater diameter than the long diameter of said opening and adapted to bear against the front face of said plate and cover and close the opening, and provided in rear of said flange with a groove extending part way around the bushing at the lower side of the latter and adapted to form a seat for the wall of the opening in the plate, the said bushing also provided with an integral projection adapted to rest within the recess for preventing the bushing from turning.

2. The combination of a suspension plate having an elliptical opening therein, and a recess communicating with said opening, a bushing shaped to conform to and fit said opening and provided at its outer end with a peripheral flange to bear against the outer face of the plate, a groove in rear of the flange at the underside of the bushing forming a seat for the wall of the opening in the plate, and an integral projection in the plane of the groove adapted to rest within the recess in the plate.

3. The combination of a suspension plate having an oblong opening therein, and a recess communicating with the upper part of said opening, and a bushing having an end flange of greater diameter than the opening in the plate, a groove in its lower half adjacent the flange to receive the plate, a tapering or beveled inner end, and an integral projection adapted to rest in the recess in the plate.

In testimony whereof, I have signed this specification in the presence of two subscribing witnesses.

JEROME G. CLINE.

Witnesses:
 FRED C. SQUIRES,
 W. J. MARSDEN.

---

Copies of this patent may be obtained for five cents each, by addressing the "Commissioner of Patents, Washington, D. C."